US011986132B2

(12) United States Patent
Liao

(10) Patent No.: US 11,986,132 B2
(45) **Date of Patent: *May 21, 2024**

(54) WARM-AIR DEVICE FOR TOILET SEAT, CONTROL METHOD AND TOILET SEAT

(71) Applicant: Shanghai Kohler Electronics, Ltd., Shanghai (CN)

(72) Inventor: Desheng Liao, Shanghai (CN)

(73) Assignee: Shanghai Kohler Electronics, Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,961

(22) Filed: Mar. 8, 2023

(65) Prior Publication Data

US 2023/0277020 A1 Sep. 7, 2023

Related U.S. Application Data

(63) Continuation of application No. 16/444,928, filed on Jun. 18, 2019, now Pat. No. 11,627,848.

(30) Foreign Application Priority Data

Jun. 20, 2018 (CN) ........................ 201810633976.0

(51) Int. Cl.
*E03D 9/08* (2006.01)
*A47K 13/24* (2006.01)
(Continued)

(52) U.S. Cl.
CPC .............. *A47K 13/305* (2013.01); *E03D 9/08* (2013.01); *H05B 3/42* (2013.01); *H05B 3/0071* (2013.01); *H05B 6/06* (2013.01)

(58) Field of Classification Search
None
See application file for complete search history.

(56) References Cited

U.S. PATENT DOCUMENTS 6,408,459 B1 6/2002 Lee
8,060,953 B1 11/2011 Dorra
(Continued)

FOREIGN PATENT DOCUMENTS

CN 101396245 A 4/2009
CN 202530541 U 11/2012
(Continued)

OTHER PUBLICATIONS

Chinese Office Action from Chinese Patent Application No. 201810633976.0, dated Feb. 22, 2021, 18 pages. (including English summary).

(Continued)

*Primary Examiner* — Joseph M. Pelham
(74) *Attorney, Agent, or Firm* — Lempia Summerfield Katz LLC

(57) ABSTRACT

A method for controlling a toilet air heating device includes: in response to a start instruction, controlling an air heating wire component to heat, controlling an air heating fan to blow air, controlling a drive motor to drive an internal air duct to extend out along an extension direction of an external air duct, and controlling an auxiliary heater to heat, wherein an air heating wire component controller controls the air heating wire component while a master controller controls the air heating fan, the drive motor, and the auxiliary heater.

20 Claims, 6 Drawing Sheets

(51) Int. Cl.

| | |
|---|---|
| ***A47K 13/30*** | (2006.01) |
| ***E03D 9/00*** | (2006.01) |
| ***H05B 3/06*** | (2006.01) |
| ***H05B 3/42*** | (2006.01) |
| *H05B 3/00* | (2006.01) |
| *H05B 6/06* | (2006.01) |

(56) References Cited

U.S. PATENT DOCUMENTS

| | | | | |
|---|---|---|---|---|
| 9,464,767 | B2 | 10/2016 | Whitfield et al. | |
| 2008/0047055 | A1 | 2/2008 | Lim | |
| 2009/0025131 | A1 | 1/2009 | Yamamoto et al. | |
| 2010/0095443 | A1* | 4/2010 | Nishimura ........... | A47K 13/305 219/217 |
| 2011/0191950 | A1 | 8/2011 | Liu | |
| 2011/0203044 | A1 | 8/2011 | Lim | |
| 2012/0119681 | A1 | 5/2012 | Seidl et al. | |
| 2018/0320354 | A1 | 11/2018 | Kang et al. | |
| 2021/0015314 | A1 | 1/2021 | Sylvia | |
| 2021/0017752 | A1 | 1/2021 | Koga et al. | |

FOREIGN PATENT DOCUMENTS

| | | | |
|---|---|---|---|
| CN | 202649843 | U | 1/2013 |
| CN | 105442681 | A | 3/2016 |
| CN | 205276419 | U | 6/2016 |
| CN | 107199383 | A | 9/2017 |
| CN | 107837462 | A | 3/2018 |
| CN | 207168446 | U | 4/2018 |
| CN | 207492723 | U | 6/2018 |
| CN | 108392129 | A | 8/2018 |
| JP | 2010112154 | A | 5/2010 |
| JP | 2010222964 | A | 10/2010 |
| KR | 20100061939 | A | 6/2010 |

OTHER PUBLICATIONS

Chinese Office Action from Chinese Patent Application No. 201810633976.0, dated Jul. 22, 2021, 16 pages. (including English summary).

Chinese Office Action from Chinese Patent Application No. 201810633976.0, dated Jun. 28, 2020, 14 pages. (including English summary).

Chinese Office Action from Chinese Patent Application No. 201810633976.0, dated Nov. 1, 2021, 14 pages. (including English summary).

CN 205276419 U, Wu et al, Jun. 2016, "Physical Therapy Function," Bibliographic sheet.

CN 205276419 U, Wu et al, Jun. 2016, "Physical Therapy Function," partial translation.

Decision of Rejection from Chinese Patent Application No. 201810633976.0, dated Nov. 1, 2021, 14 pages. (including English summary).

JP 2010222964 A, Kuniki et al, Oct. 2010, "Hygenic Cleaning Device," Bibliographic sheet.

JP 2010222964 A, Kuniki et al, Oct. 2010, "Hygenic Cleaning Device," partial translation.

* cited by examiner

WARM-AIR DEVICE FOR TOILET SEAT, CONTROL METHOD AND TOILET SEAT

CROSS REFERENCES TO RELATED APPLICATIONS

This application is a continuation of co-pending U.S. patent application Ser. No. 16/444,928, filed Jun. 18, 2019, which is hereby incorporated by reference in its entirety, and which claims the benefit of priority to Chinese Patent Application No. 201810633976.0, filed in the Chinese Intellectual Property Office on Jun. 20, 2018, which is hereby incorporated by reference in its entirety.

FIELD

The present disclosure relates to the field of bathroom equipment-related technologies. More specifically, this application relates to an air heating device and control method for use with toilets (e.g., toilet seats) and the like.

BACKGROUND

Toilets are common bathroom products. To make toilets more comfortable, some existing toilets have an additional drying module to provide warm air for drying after a human body is cleaned, so as to improve the comfort.

However, the existing toilet drying module has an internal air duct fixed inside the product, and the position of the air outlet is fixed. As a result, the direction in which the warm air is blown cannot effectively overlap with certain cleaned human body parts, leading to a low drying efficiency. In addition, due to the limited space of the internal structure, most products cannot be provided with a heating infrared device to provide infrared care functions. To provide an infrared or other air heating module, an independent component needs to be provided separately, which takes up the internal space of the toilet body.

SUMMARY

In light of the issues and limitations noted above, it would be advantageous to provide a toilet air heating device and control method for toilets (and the like) that solve the technical problems of the prior art, such as their issue of provide a low drying efficiency.

The present disclosure provides such a toilet air heating device. At least one embodiment of the device includes an air heating fan, an external air duct, an internal air duct, an air heating wire component, a drive mechanism, and a controller. The external air duct accommodates the internal air duct inside the external air duct, and the internal air duct is able to telescope, as driven by the drive mechanism, along an extension direction of the external air duct. An air outlet of the air heating fan is sequentially in communication with the air heating wire component, the external air duct, and the internal air duct. An internal air duct outlet of the internal air duct is provided with an auxiliary heater. The air heating wire component, the air heating fan, the drive mechanism, and the auxiliary heater are in communication connection with the controller, respectively.

At least one embodiment of the drive mechanism includes a drive motor, which is fixed on one side of the internal air duct, and an internal air duct side rack, which is disposed on a side wall of the internal air duct close to the drive motor. An output shaft of the drive motor includes one or more drive gears thereon, and the internal air duct side rack meshes with the drive gears. The drive motor is in communication connection with the controller, and the master controller controls the drive motor to rotate clockwise, rotate counter-clockwise, or stop rotation.

At least one embodiment of the internal air duct outlet of the internal air duct includes an air duct structure that tilts upwardly.

At least one embodiment of the air duct structure includes a plurality of air outlet louvers that are arranged at the internal air duct outlet and form an angle with the normal line of the plane on which the internal air duct outlet is located. The plurality of air outlet louvers have gaps therebetween in communication with the internal air duct outlet.

At least one embodiment of the controller includes an air heating wire component controller, which is in communication connection with the air heating wire component, and a master controller, which is in communication connection with the air heating fan, the drive mechanism, and the auxiliary heater, respectively.

At least one embodiment of the auxiliary heater includes an infrared lamp tube or a ceramic infrared heating rod.

At least one embodiment includes a temperature sensor arranged between the air outlet of the air heating fan and the external air duct.

At least one embodiment of the present invention provides a control method for the foregoing toilet air heating device. The method involves: in response to a start instruction, the controller controls the air heating wire component to heat, controls the air heating fan to blow the air, controls the drive motor to drive the internal air duct to extend out along the extension direction of the external air duct, and controls the auxiliary heater to heat; or in response to a stop instruction, the controller controls the air heating wire component to stop heating, controls the auxiliary heater to stop heating, controls the air heating fan to stop blowing the air, and controls the drive motor to drive the internal air duct to retract back along the extension direction of the external air duct.

At least one embodiment of the present invention provides a toilet that includes a toilet body and a seat disposed on the toilet body. The toilet body close to the back of the seat is provided with an accommodating cavity therein for accommodating (e.g., receiving) the foregoing toilet air heating device. The accommodating cavity includes a through hole, and the internal air duct outlet of the internal air duct of the toilet air heating device can extend out from the through hole.

Further, the internal air duct is extendable, as driven by the drive mechanism, along the extension direction of the external air duct until the internal air duct outlet reaches a preset position underneath of the seat.

The air heating devices/modules disclosed herein achieve, among other things, a telescopic function by driving the internal air duct with the drive mechanism. This arrangement solves problems associated with current devices, such as having fixed air outlets and the air outgoing direction not aligned well with a cleaned body part to be dried. Further, the air heating devices/modules disclosed herein can guide warm air to dry a cleaned part of human body and improve the drying efficiency. At the same time, an auxiliary heater (if provided) can be turned on at the same time when the air heating function is turned on, so as to provide warm infrared ray to perform warm care on the cleaned part of human body or to provide warm care to the abdomen of a female to promote local blood circulation.

BRIEF DESCRIPTION OF THE FIGURES

The disclosure will become more fully understood from the following detailed description, taken in conjunction with the accompanying figures, wherein like reference numerals refer to like elements.

DETAILED DESCRIPTION

Figure 1:
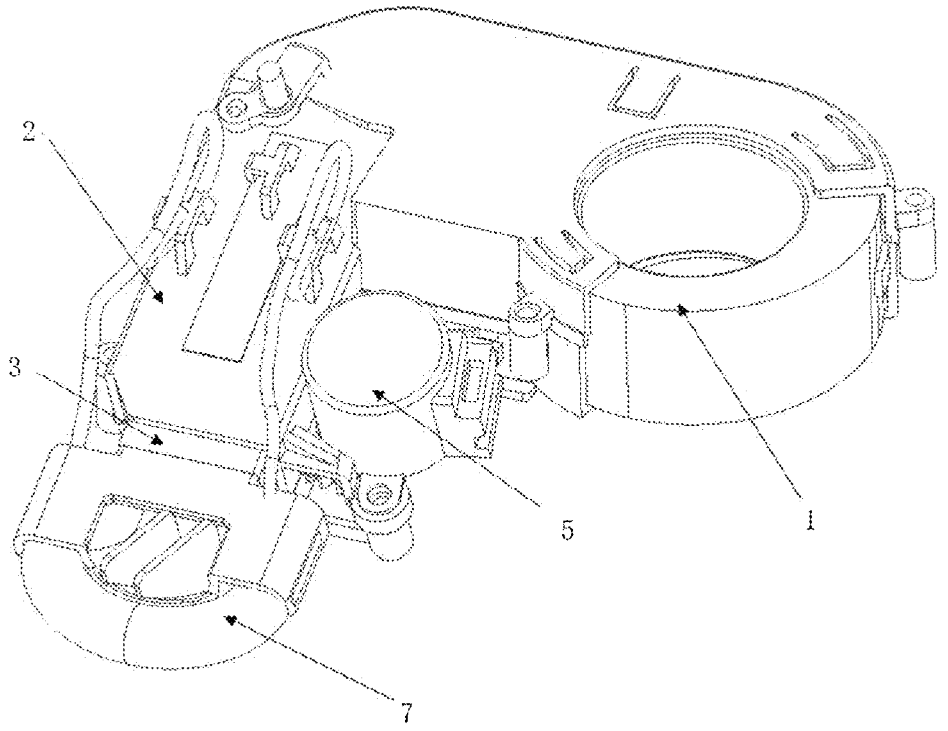
FIG. 1 is a schematic view of a toilet air heating device in a non-operating state, according to an embodiment of the present application.

The present invention will be further described in detail below with reference to the accompanying drawings and specific embodiments.

FIGS. 1-5 illustrate a toilet air heating device according to the present application. The illustrated toilet air heating device includes an air heating fan 1, an external air duct 2, an internal air duct 3, an air heating wire component 101, a drive mechanism, and a controller. The internal air duct 3 is accommodated or located inside the external air duct 2, and the internal air duct 3 telescopically moves, as driven by the drive mechanism, along an extension direction of the external air duct 2 (see FIGS. 2 and 3). An air outlet of the air heating fan 1 is sequentially in communication (e.g., fluid communication, structural, etc.) with the air heating wire component 101, the external air duct 2, and the internal air duct 3. Also shown in FIGS. 2 and 3, an internal air duct outlet 31 of the internal air duct is provided with an auxiliary heater 7. The air heating wire component 101, the air heating fan 1, the drive mechanism, and the auxiliary heater 7 are in communication connection (e.g., electronic communication, etc.) with the controller, respectively.

Figure 2:
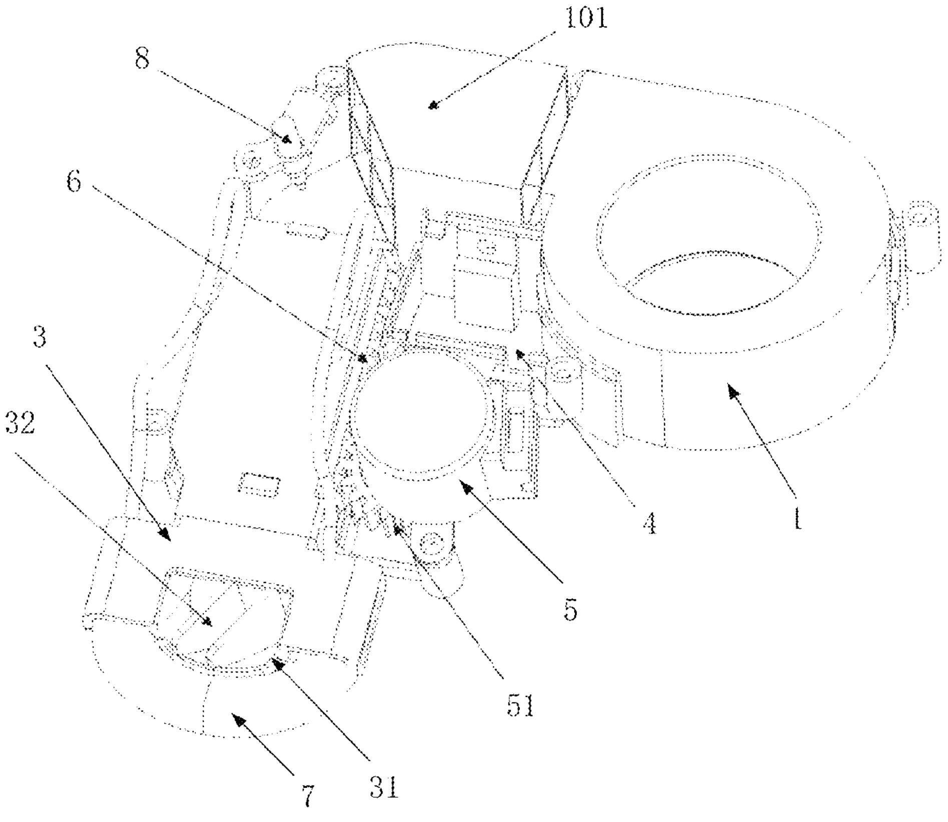
FIG. 2 is a schematic view of an internal air duct in the non-operating state of the toilet air heating device, according to an embodiment of the present application.
Figure 3:
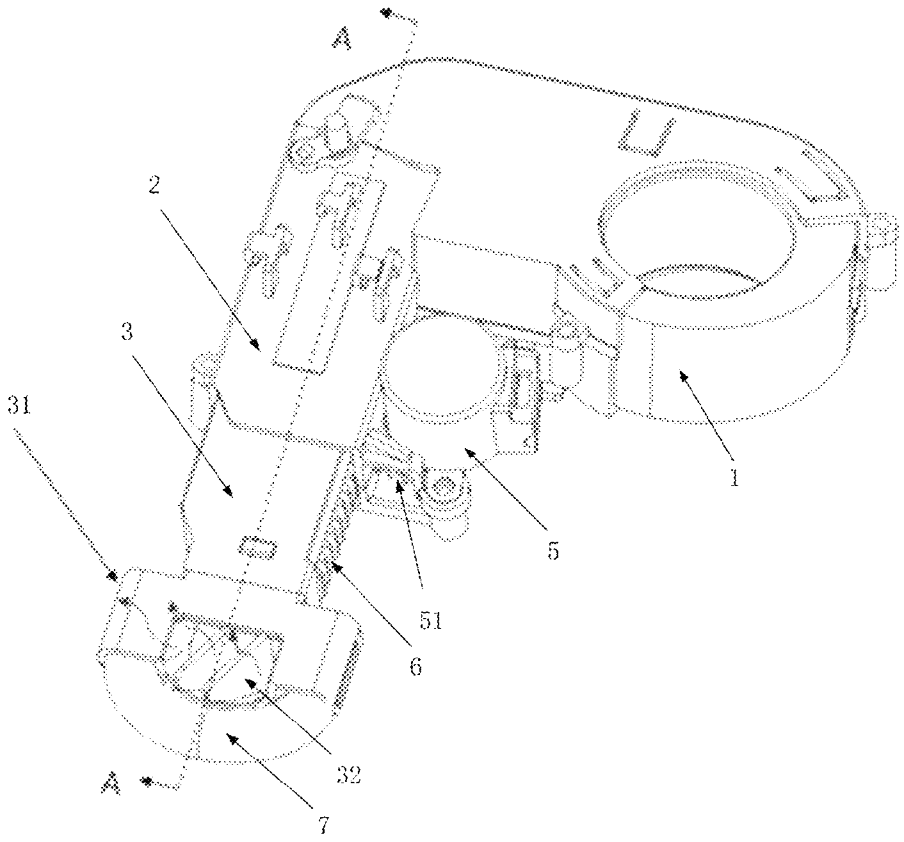
FIG. 3 is a schematic view of the toilet air heating device in an operating state, according to an embodiment of the present application.

The controller 4 includes an air heating wire component controller, which may include an integrated PCB, where the air heating wire component controller controls the air heating wire component 101 to switch on and off. The controller 4 can also include a master controller that controls the air heating fan 1 to be sequentially in communication with the external air duct 2 and the internal air duct 3, provides warm air to the internal air duct 3, and controls the drive mechanism to drive movement of the internal air duct 3. For example, the internal air duct 3 can move telescopically between an extended position (e.g., where the internal air duct 3 extends out from the external air duct 2) and a retracted position (e.g., where the internal air duct 3 nests inside the external air duct 2). FIG. 2 shows the internal air duct 3 in the retracted position; and FIG. 3 shows the internal air duct 3 in the extended position. The auxiliary heater 7 is integrated onto an internal air duct outlet 31, such as at the front end of the internal air duct 3, and becomes an integral piece with the internal air duct outlet 31. Thus, the auxiliary heater 7 extends out or retracts back together with the internal air duct 3 to provide warm care for a cleaned body part, such as to promote local blood circulation.

The air heating module or assembly of the present application achieves a telescopic function by driving the internal air duct 3 relative to the external air duct 2 with the drive mechanism. This arrangement advantageously solves the problem that an existing air outlet is fixed and the air outgoing direction is not aligned well with a desired/cleaned body part to be dried, and can guide warm air to dry a cleaned part of human body and improve the drying efficiency. The auxiliary heater 7 can be turned on at the same time when the air heating function is turned on to provide warm infrared rays to perform warm care on the desired/cleaned part of human body (e.g., to provide warm care to the abdomen of a female to promote local blood circulation).

In one or more embodiments, the drive mechanism includes a drive motor 5, which is fixed on one side of the internal air duct 3, and an internal air duct side rack 6, which is disposed on a side wall of the internal air duct 3 close to the drive motor 5. An output shaft of the drive motor 5 is provided with drive gears 51 thereon, and the internal air duct side rack 6 meshes with the drive gears. The drive motor 5 is in communication connection with the controller, such that the controller controls the drive motor 5 to rotate in a direction (e.g., clockwise, counter-clockwise) or stop rotation of the drive motor.

In one or more embodiments, the drive motor 5 rotates to control the drive gears 51 to drive the internal air duct 3 to extend out of or retract into the external air duct 2. For example, the drive gears 51 act as a pinion, such that rotation of the drive gears 51 by the drive motor 5 in-turn moves the internal air duct side rack 6 (e.g., linearly) along with the internal air duct 3 coupled to the internal air duct side rack 6.

In one or more embodiments, the internal air duct outlet 31 of the internal air duct 3 includes an air duct structure that tilts upwardly. In at least one such embodiment, the internal air duct outlet 31 is at the front end of the internal air duct 3 and is provided with an air duct structure that tilts upwardly. The warm air can blow out along this structure in an upwardly inclined direction.

In one or more embodiments, the air duct structure includes a plurality of air outlet louvers 32 arranged at the internal air duct outlet 31 and forming an angle with the normal line of the plane on which the internal air duct outlet 31 is located. As shown in FIGS. 2 and 3, the plurality of air outlet louvers 32 have gaps therebetween in communication with the internal air duct outlet 31.

In one or more embodiments, the controller 4 includes the air heating wire component controller, which is in communication connection with the air heating wire component 101, and a master controller, which is in communication connection with each of the air heating fan, the drive mechanism, and the auxiliary heater. In the illustrated embodiment, the functionality of the air heating wire component controller is separated from the functionality of the master controller in the controller 4 to thereby reduce control operations to be handled by the master controller, such that the master controller may use a chip of a relatively small size.

In one or more embodiments, the auxiliary heater 7 includes an infrared lamp tube and/or a ceramic infrared heating rod. The auxiliary heater 7 can include a U-shaped or an arc-shaped infrared lamp tube and/or a U-shaped ceramic heating rod.

In one or more embodiments, a temperature sensor 8 is provided to monitor a temperature of the device. As shown in FIG. 2, the temperature sensor 8 is arranged between the air outlet of the air heating fan 1 and the external air duct 2.

An exemplary control method for controlling any of the toilet air heating devices in this application include the following steps/processes. In response to a start instruction, the controller controls: the air heating wire component 101 to heat; the air heating fan 1 to blow the air; the drive motor 5 to drive the internal air duct 3 to extend out along the extension direction of the external air duct 2; and/or the auxiliary heater 7 to heat. In response to a stop instruction, the controller controls: the air heating wire component 101 to stop heating; the auxiliary heater 7 to stop heating; the air heating fan 1 to stop blowing the air; and/or the drive motor 5 to drive the internal air duct 3 to retract back along the extension direction of the external air duct 2.

During operation, the internal air duct outlet 31 at the front end of the internal air duct 3 is extendable to a preset position outside of the product (e.g., the external air duct 2) to guide the warm air in an upwardly inclined direction to dry a cleaned part of human body. The internal air duct outlet 31 is retractable into the product when the operations conclude. The auxiliary heater 7 (e.g., an infrared lamp tube) may be turned on at the same time when the air heating function is turned on according to an instruction. The auxiliary heater 7 can provide warm infrared ray to perform warm care on the cleaned part of human body or to provide warm care to the abdomen of a female to promote local blood circulation. For example, warm air from the air heating fan can pass on or over the surface of the infrared lamp tube to reheat the warm air and to dissipate heat from the external surface of the lamp tube. In other words, the warm air and the external surface of the lamp tube have a heat exchange. This prevents high temperature on the surface of the infrared lamp tube and consequent safety risk due to overly high temperature increase on the surface of the lamp tube.

According to an exemplary embodiment, a toilet air heating device includes an air heating fan 1, an external air duct 2, an internal air duct 3, an air heating wire component, a drive motor 5, an internal air duck side rack 6, and a controller 4. The drive motor 5 is fixed on one side of the internal air duct 3 and the internal air duct side rack 6 is disposed on a side wall of the internal air duct 3 close to the drive motor 5. The internal air duct 3 is accommodated inside the external air duct 2, and an air outlet of the air heating fan 1 is sequentially in communication with the external air duct 2 and the internal air duct 3. The controller 4 includes an air heating wire component controller and/or a master controller. If provided, the air heating wire component controller is connected with the air heating wire component and the master controller is in communication connection with the air heating fan and the drive motor 5, respectively. An output shaft of the drive motor 5 includes drive gears 51 thereon, the internal air duct side rack 6 meshes with the drive gears, and the drive motor 5 is in communication connection with the master controller. The master controller controls the drive motor 5 to rotate clockwise, rotate counter-clockwise, or stop rotation of the drive motor, thereby driving the internal air duct 3 to telescope relative to the external air duct 2 along an extension direction of the external air duct 2.

The internal air duct outlet 31 of the internal air duct 3 includes an air duct structure 32, which can tilt upwardly, and an auxiliary heater 7, which is in communication connection with the master controller. The auxiliary heater 7 can include a U-shaped or arc-shaped infrared lamp tube or a U-shaped ceramic heating rod.

Figure 4:
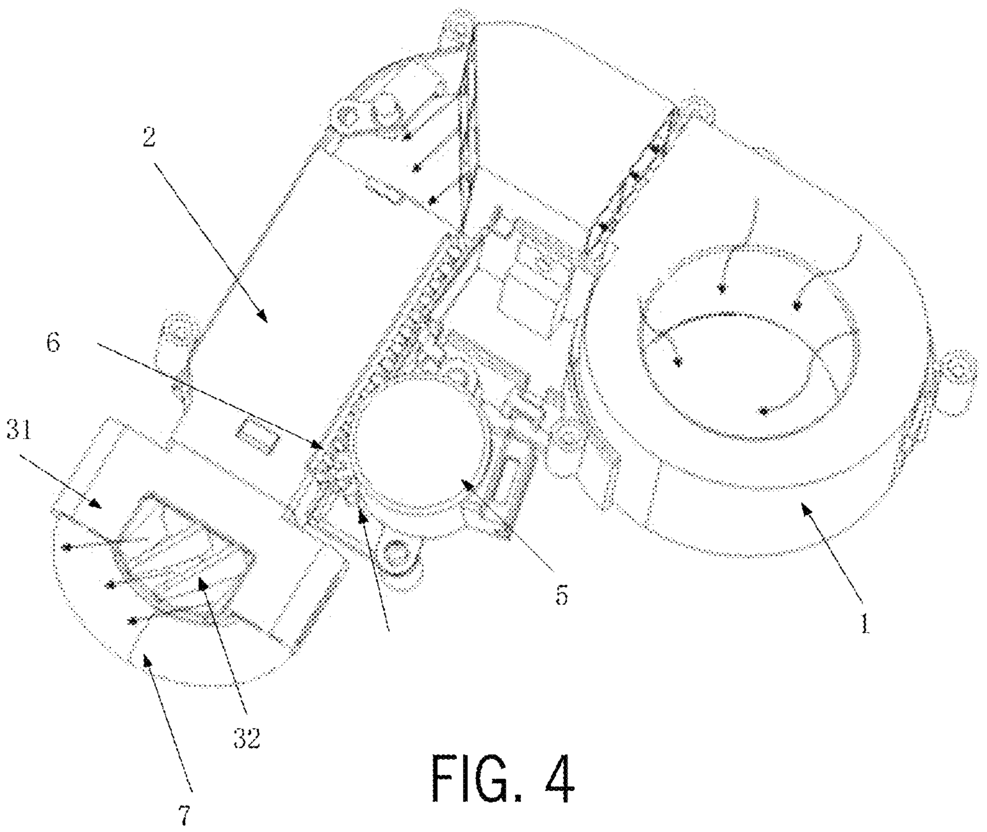
FIG. 4 is a schematic view of the internal air duct in the operating state of the toilet air heating device, according to an embodiment of the present application.
Figure 5:
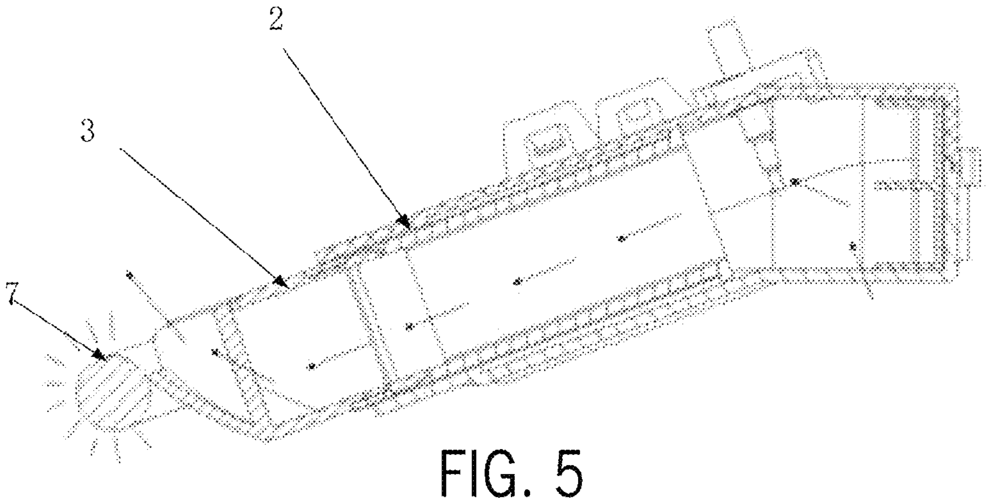
FIG. 5 is a cross-sectional view of the toilet air heating device taken along line A-A in FIG. 3.

As shown in FIGS. 3-5, the air heating wire component controller controls the air heating wire component to heat in response to a start instruction. The master controller can control the air heating fan to blow the air, controls the drive motor to drive the internal air duct to extend out along the extension direction of the external air duct, and controls the auxiliary heater to heat in response to a start instruction.

As shown in FIGS. 1 and 2, the controller 4 can provide a stop instruction. For example, the air heating wire component controller controls the air heating wire component to stop heating in response to a stop instruction. Also, for example, the master controller controls the auxiliary heater to stop heating, controls the air heating fan to stop blowing the air, and controls the drive motor to drive the internal air duct to retract back along the extension direction of the external air duct in response to a stop instruction.

Figure 6:
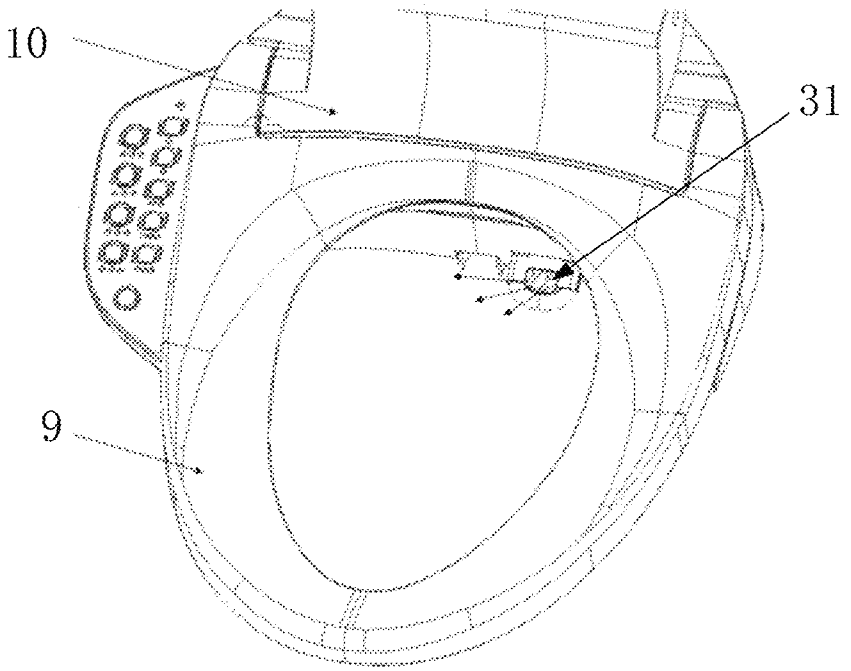
FIG. 6 is a schematic view of a toilet configured to employ an air heating device, according to the present application.
Figure 7:
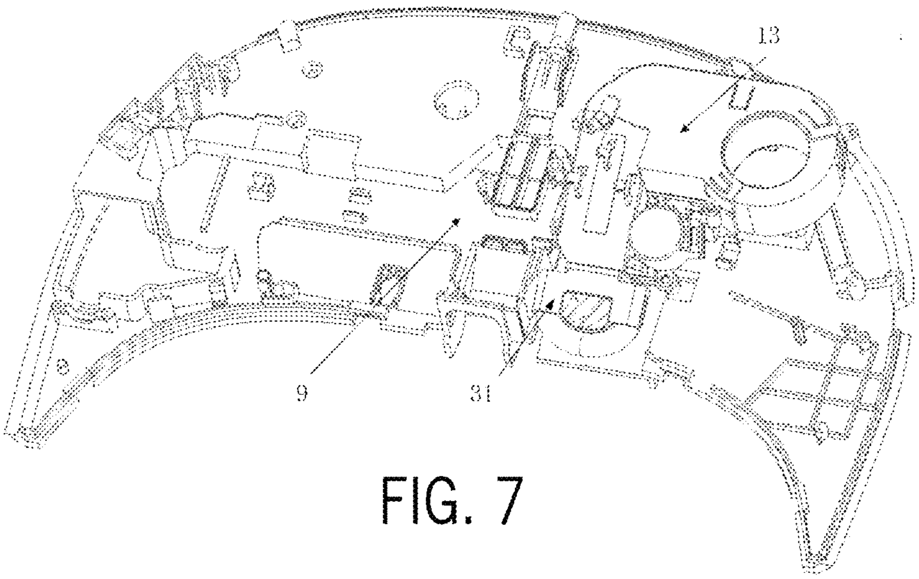
FIG. 7 is a schematic view of a portion of the toilet shown in FIG. 6 in a non-operating state of the toilet.
Figure 8:
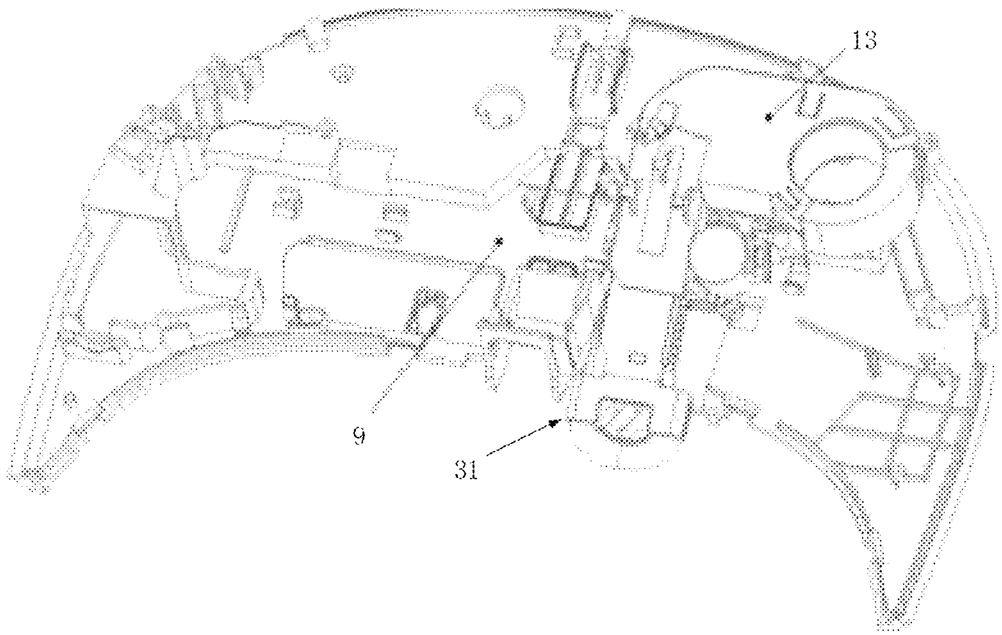
FIG. 8 is a schematic view of the portion of the toilet shown in FIG. 7 shown in an operating state of the toilet.

FIGS. 6-8 show an exemplary embodiment of a toilet. The toilet includes a toilet body (e.g., bowl, pedestal, etc.) and a seat 9 disposed on the toilet body. The toilet body at the back of the seat 9 is provided with an accommodating cavity therein for accommodating the foregoing toilet air heating device 13. The accommodating cavity is provided with a through hole, and the internal air duct outlet 31 of the internal air duct of the toilet air heating device 13 can extend out from the through hole. More specifically, the toilet air heating device is accommodated in the accommodating cavity formed by a main cover 10 and a base 11.

In one or more of the embodiments, the internal air duct extends, as driven by the drive mechanism, along the extension direction of the external air duct until the internal air duct outlet 31 reaches a preset position underneath of the seat 9. More specifically, in response to the start instruction, the master controller controls the air heating fan to blow the air, controls the drive motor to drive the internal air duct to extend out along the extension direction of the external air duct until the internal air duct outlet 31 reaches a preset position underneath of the seat 9, and/or controls the auxiliary heater to heat. In response to the stop instruction, the master controller controls the air heating fan to stop blowing the air, controls the drive motor to drive the internal air duct to retract back into the accommodating cavity along the extension direction of the external air duct, and/or controls the auxiliary heater to stop heating.

The foregoing embodiments merely describe several implementation manners of the present invention. The description thereof is detailed and specific, which, however, shall not be construed as limitations to the scope of the present invention. It should be noted that several variations and improvements may be made by a person skilled in the art without departing from the concept of the present invention, all of which shall fall within the protection scope of the present invention. Therefore, the protection scope of the present invention shall be subject to the appended claims.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the toilets, toilet air heating devices/systems/methods, as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

I claim:

1. A method for controlling a toilet air heating device, the method comprising:

in response to a start instruction, controlling an air heating wire component to heat, controlling an air heating fan to blow air, controlling a drive motor to drive an internal air duct including an auxiliary heater to extend out along an extension direction of an external air duct, and controlling the auxiliary heater to heat, wherein an air heating wire component controller controls the air heating wire component while a master controller controls the air heating fan, the drive motor, and the auxiliary heater.

2. The method according to claim 1, wherein the controlling the drive motor to drive the internal air duct to extend out along the extension direction of the external air duct comprises:

controlling the internal air duct to a preset position outside of the external air duct.

3. The method according to claim 2, wherein the controlling the drive motor to drive the internal air duct to extend out along the extension direction of the external air duct further comprises:

in response to the start instruction, telescopically moving, by the drive motor, the internal air duct relative to the external air duct into an extended position from a retracted position.

4. The method according to claim 3, wherein the telescopically moving, by the drive motor, the internal air duct relative to the external air duct into the extended position from the retracted position comprises:

controlling, by the master controller, the drive motor to rotate clockwise or counter-clockwise.

5. The method according to claim 1, further comprising:

blowing, by the air heating fan, the air on an external surface of the auxiliary heater to perform a heat exchange between the air from the air heating fan and the external surface of the auxiliary heater, wherein the air from the air heating fan dissipates heat from the external surface of the auxiliary heater, and wherein the heat from the external surface of the auxiliary heater reheats the air from the air heating fan.

6. The method according to claim 5, wherein the controlling the air heating fan to blow the air and the controlling the auxiliary heater to heat are performed at the same time.

7. The method according to claim 1, further comprising:

when the air heating fan blows the air, outputting the air through at least one gap formed by a plurality of air outlet louvers arranged at an internal air duct outlet of the internal air duct and extending from the internal air duct outlet, wherein the at least one gap is in air communication with the internal air duct outlet of the internal air duct.

8. The method according to claim 7, further comprising:

when the air heating fan blows the air, outputting the air from the internal air duct outlet of the internal air duct in an upwardly inclined direction, wherein the plurality of air outlet louvers form an angle with a normal line of a plane on which a planar upper surface of the internal air duct outlet of the internal air duct is located.

9. The method according to claim 1, further comprising:

monitoring, by a sensor, a temperature at an air outlet of the air heating fan.

10. The method according to claim 1, further comprising:

in response to a stop instruction, controlling the air heating wire component to stop heating, controlling the auxiliary heater to stop heating, controlling the air heating fan to stop blowing the air, and controlling the drive motor to drive the internal air duct to retract back along the extension direction of the external air duct.

11. A system for controlling a toilet air heating device, the system comprising:

a master controller communicably coupled to an air heating fan, a drive motor, and an auxiliary heater of the toilet air heating device, the master controller configured to:

in response to a start instruction, control the air heating fan to blow air, control the drive motor to drive an internal air duct and the auxiliary heater to extend out along an extension direction of an external air duct, and control the auxiliary heater to heat; and an air heating wire component controller communicably coupled to an air heating wire component of the toilet air heating device, the air heating wire component controller configured to:

in response to the start instruction, control the air heating wire component to heat.

12. The system according to claim 11, wherein the master controller is further configured to control the internal air duct to a preset position outside of the external air duct.

13. The system according to claim 12, wherein in response to the start instruction, the master controller is further configured to control the drive motor to telescopically move the internal air duct relative to the external air duct into an extended position from a retracted position.

14. The system according to claim 13, wherein the master controller is further configured to control the drive motor to rotate clockwise or counter-clockwise.

15. The system according to claim 11, wherein the master controller is further configured to control the air heating fan to blow the air on an external surface of the auxiliary heater to perform a heat exchange between the air from the air heating fan and the external surface of the auxiliary heater, wherein the air from the air heating fan dissipates heat from the external surface of the auxiliary heater, and wherein the heat from the external surface of the auxiliary heater reheats the air from the air heating fan.

16. The system according to claim 15, wherein the master controller is configured to control the air heating fan to blow the air and control the auxiliary heater to heat at the same time.

17. The system according to claim 11, wherein when the air heating fan blows the air, the air is output through at least one gap formed by a plurality of air outlet louvers arranged at an internal air duct outlet of the internal air duct and extending from the internal air duct outlet, wherein the at least one gap is in air communication with the internal air duct outlet of the internal air duct.

18. The system according to claim 17, wherein when the air heating fan blows the air, the air is output from the internal air duct outlet of the internal air duct in an upwardly inclined direction.

19. The system according to claim 11, further comprising a sensor configured to monitor a temperature at an air outlet of the air heating fan.

20. The system according to claim 11, wherein the master controller is further configured to:

in response to a stop instruction, control the auxiliary heater to stop heating, control the air heating fan to stop blowing the air, and control the drive motor to drive the internal air duct to retract back along the extension direction of the external air duct, and wherein the air heating wire component controller is further configured to:

in response to the stop instruction, controlling the air heating wire component to stop heating.

* * * * *